United States Patent
Kim et al.

(10) Patent No.: US 9,026,054 B2
(45) Date of Patent: May 5, 2015

(54) METHOD AND APPARATUS FOR DETECTING RADIO SIGNAL

(71) Applicants: LG Electronics Inc., Seoul (KR);
Postech Academy-Industry Foundation, Pohang-si Gyeongbuk (KR)

(72) Inventors: Ki Jun Kim, Anyang-si (KR); Jeong Ho Yeo, Pohang-si (KR); Joon Ho Cho, Pohang-si (KR)

(73) Assignees: LG Electronics Inc., Seoul (KR);
Postech Academy-Industry Foundation, Nam-gu, Pohang-si, Gyeongbuk (KR)

( * ) Notice: Subject to any disclaimer, the term of this patent is extended or adjusted under 35 U.S.C. 154(b) by 321 days.

(21) Appl. No.: 13/718,874

(22) Filed: Dec. 18, 2012

(65) Prior Publication Data

US 2013/0157600 A1 Jun. 20, 2013

Related U.S. Application Data

(60) Provisional application No. 61/578,191, filed on Dec. 20, 2011.

(51) Int. Cl.
| | |
|---|---|
| *H04B 15/00* | (2006.01) |
| *H04B 17/00* | (2006.01) |
| *H04B 3/46* | (2006.01) |
| *H04Q 1/20* | (2006.01) |
| *H04W 24/02* | (2009.01) |
| *H04L 27/00* | (2006.01) |
| *H04L 27/26* | (2006.01) |
| *H04L 27/22* | (2006.01) |

(52) U.S. Cl.
CPC .......... *H04W 24/02* (2013.01); *H04L 27/0006* (2013.01); *H04L 27/22* (2013.01); *H04L 27/2678* (2013.01)

(58) Field of Classification Search
USPC ........... 455/62, 67.11, 71, 77, 550.1; 375/224
See application file for complete search history.

(56) References Cited

U.S. PATENT DOCUMENTS

| | | | | |
|---|---|---|---|---|
| 6,625,197 | B1* | 9/2003 | Lundby et al. | 375/130 |
| 7,907,512 | B1* | 3/2011 | von der Embse | 370/208 |
| 2004/0076185 | A1* | 4/2004 | Kim et al. | 370/488 |
| 2005/0047484 | A1* | 3/2005 | He et al. | 375/148 |
| 2008/0175336 | A1* | 7/2008 | Sakata | 375/303 |
| 2009/0068951 | A1* | 3/2009 | Mishali et al. | 455/59 |
| 2010/0246636 | A1* | 9/2010 | Haartsen | 375/130 |
| 2011/0075711 | A1* | 3/2011 | Hasegawa | 375/147 |
| 2012/0172041 | A1* | 7/2012 | Krishnamurthy et al. | 455/436 |
| 2012/0250852 | A1* | 10/2012 | Rowley | 379/406.01 |
| 2012/0263215 | A1* | 10/2012 | Peng | 375/221 |

\* cited by examiner

*Primary Examiner* — Andrew Wendell
(74) *Attorney, Agent, or Firm* — McKenna Long & Aldridge LLP

(57) ABSTRACT

A method for detecting a radio signal in a wireless communication system is provided. According to the method, a wireless device measures an input signal received by a RF unit of. The wireless device eliminates a duplicated part between the input signal and a complex conjugate signal of the input signal to generate a filtered signal. The wireless device determines whether a target signal exists in the input signal based on the filtered signal.

15 Claims, 9 Drawing Sheets

FIG. 5
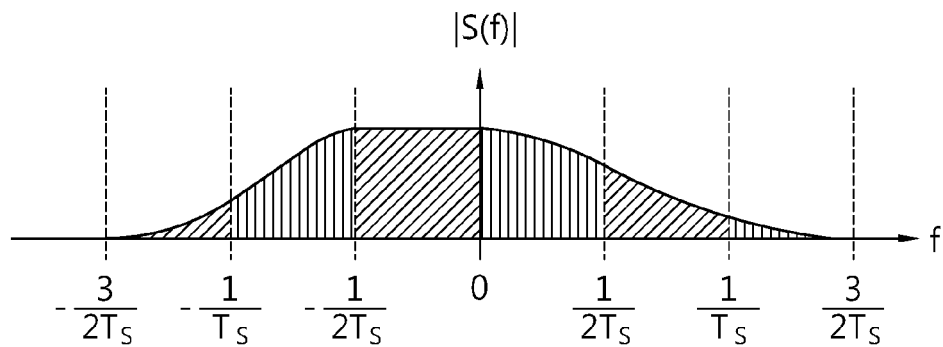
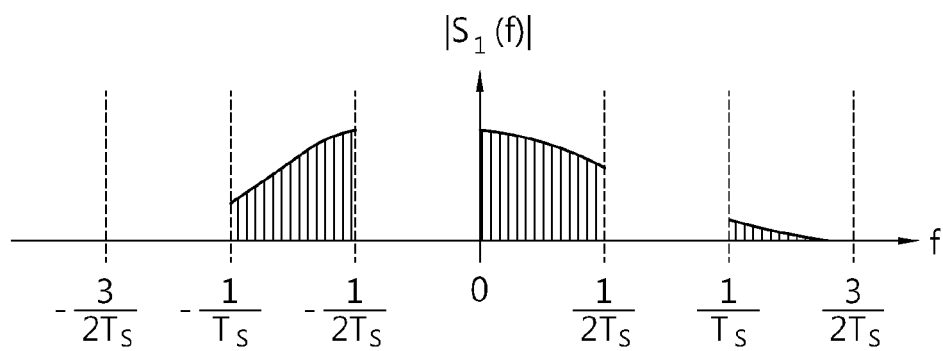
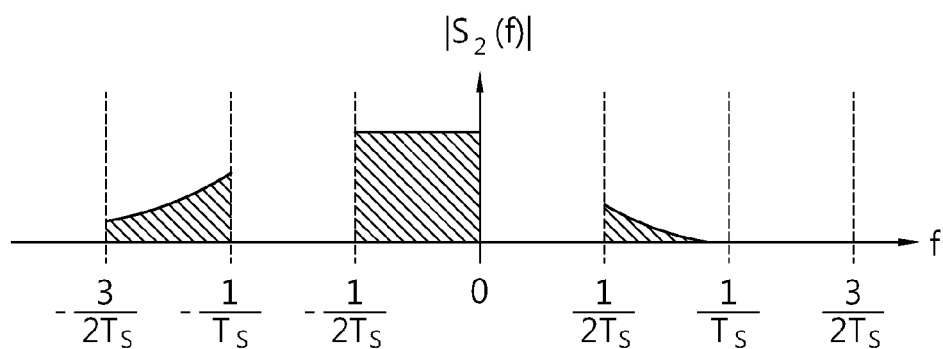

METHOD AND APPARATUS FOR DETECTING RADIO SIGNAL

CROSS-REFERENCE TO RELATED APPLICATIONS

This application claims the benefit of priority of U.S. Provisional application 61/578,191 filed on Dec. 20, 2011, all of which are incorporated by reference in their entirety herein.

BACKGROUND OF THE INVENTION

1. Field of the Invention

The present invention relates to wireless communications, and more particularly, to a method and an apparatus for detecting a radio signal.

2. Related Art

Recently, services that require ultrahigh speed wireless communications such as wireless Internet are rapidly increasing. Therefore, researches on communication techniques capable of guaranteeing the ultrahigh speed wireless communications are actively performed.

In particular, researches on efficiently using resources such as time, frequency, and space for a plurality of users are actively performed. However, since the frequency resource may be used only by a user authorized to use the corresponding frequency, when an authorized business does not use the corresponding frequency band, no one uses the corresponding frequency resource so that the frequency resource is wasted.

Therefore, recently, in order to reduce such waste and to efficiently make temporal and spatial use of the frequency resource, a cognitive radio technology of finding out a frequency band that is not used to perform communications is spotlighted. In accordance with the cognitive radio technology, the temporally and spatially empty frequency band is used so that the efficiency of use of the frequency resource may be maximized.

Recently, as the federal communication commission (FCC) revises regulation so that the cognitive radio technology may be used in a TV frequency band, an environment for applying the cognitive radio technology is created and standardization of the cognitive radio technology such as IEEE 802.22 is being performed.

On the other hand, in order for an unauthorized user to use the temporally and spatially empty frequency band, a frequency detecting technology or a signal detecting technology is important. The detecting technologies suggested until now require complicated operations so that operation complexity is high.

SUMMARY OF THE INVENTION

The present invention provides a method and an apparatus for detecting a radio signal.

The present invention also provides a method and an apparatus for detecting a signal of a specific user having a second-order cyclostationary feature.

The present invention also provides a method and an apparatus for finding out a frequency band that is not used by a cellular network or an ad-hoc network.

In an aspect, a method for detecting a radio signal in a wireless communication system is provided. A wireless device measures an input signal received by a RF unit of the wireless device. The wireless device eliminates a duplicated part between the input signal and a complex conjugate signal of the input signal to generate a filtered signal. The wireless device determines whether a target signal exists in the input signal based on the filtered signal.

In another aspect, a wireless device in a wireless communication system is provided. The wireless device includes a radio frequency (RF) unit for receiving a radio signal and a processor, operatively coupled with the radio frequency unit. The processor is configured to measure an input signal received by the RF unit, eliminate a duplicated part between the input signal and a complex conjugate signal of the input signal to generate a filtered signal, and determine whether a target signal exists in the input signal in the input signal based on the filtered signal.

BRIEF DESCRIPTION OF THE DRAWINGS

FIG. 5 illustrates an example of the input of the FRESH properizer and the output of the FRESH properizer.

DESCRIPTION OF EXEMPLARY EMBODIMENTS

Hereinafter, the embodiments of the present invention will be described in detail with reference to the accompanying drawings.

Figure 1:
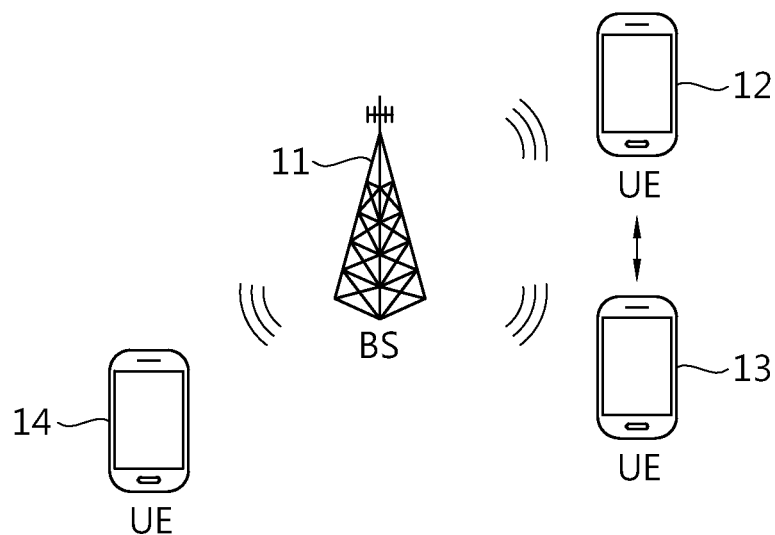
FIG. 1 is a schematic diagram of a wireless cellular network system.

FIG. 1 is a schematic diagram of a wireless cellular network system.

A wireless cellular network system includes at least one base station (BS) 11. A BS 11 provides communication services to a specific geographical region (generally referred to as a cell) 15. The cell can be divided into a plurality of regions (referred to as sectors).

User equipments (UE) 12, 13, and 14 may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

The BS 11 is generally a fixed station that communicates with the UEs 12, 13, and 14 and may be referred to as another terminology, such as an evolved node-B (eNB), a base transceiver system (BTS), an access point, etc.

Meanwhile, the respective UEs may communicate with the BS 11, however, may directly communicate with other UEs using a specific frequency band without passing through the BS. For example, when the UE 12 directly communicates with the UE 13 using a specific frequency band, since not only the UEs 12 and 13 but also the other UE 14 may communicate with the BS 11 using the corresponding frequency band, it is necessary for the UEs 12 and 13 to confirm whether the frequency band to be used thereby is used or empty. At this time, the other UE 14 may use a modulation method such as binary phase shift keying (BPSK), quadrature phase shift keying (QPSK), pulse amplitude modulation (PAM), quadrature amplitude modulation (QAM), offset QPSK (QQPSK), minimum-shift keying (MSK), and orthogonal frequency-division multiple access (OFDMA) having a second-order cyclostationary feature.

Figure 2:
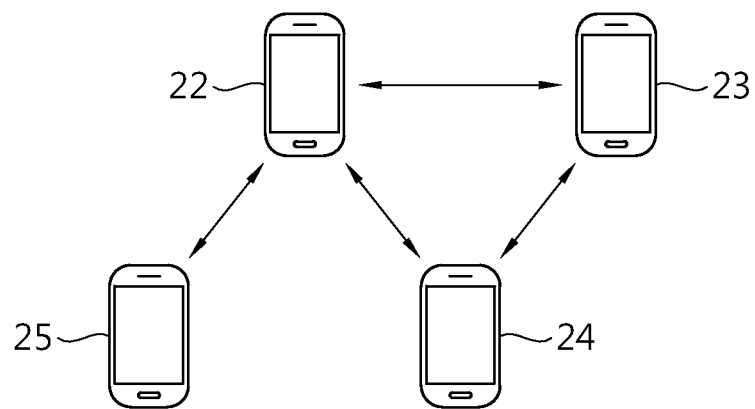
FIG. 2 is a schematic diagram of a wireless ad-hoc network system.

FIG. 2 is a schematic diagram of a wireless ad-hoc network system.

In a wireless ad-hoc network system, direct communications among UEs 22, 23, 24, and 25 are performed without a BS. When the UE 22 and the UE 24 communicate with each other, the UE 22 must confirm whether a specific frequency band is used or empty in order to communicate with the UE 24 without interfering the other UEs 23 and 25, like in the wireless cellular network system.

Hereinafter, a wireless communication method of detecting a signal having the second-order cyclostationary feature to confirm whether the specific frequency band is used and a wireless device that operates in accordance with the above method will be described.

According to a conventional signal detecting method, complicated operation processes of considering an input signal and a complex conjugate signal of the input signal and of obtaining an inverse matrix or of performing eigenvalue decomposition are performed. On the other hand, according to the present invention, [1] a duplicated part is eliminated between the input signal and the complex conjugate signal and [2] the frequency-domain covariance matrix of the input signal from which the duplicated part is eliminated is approximated with a block matrix with diagonal block. Therefore, a signal having the second-order cyclostationary feature may be effectively detected with low complexity.

Figure 3:
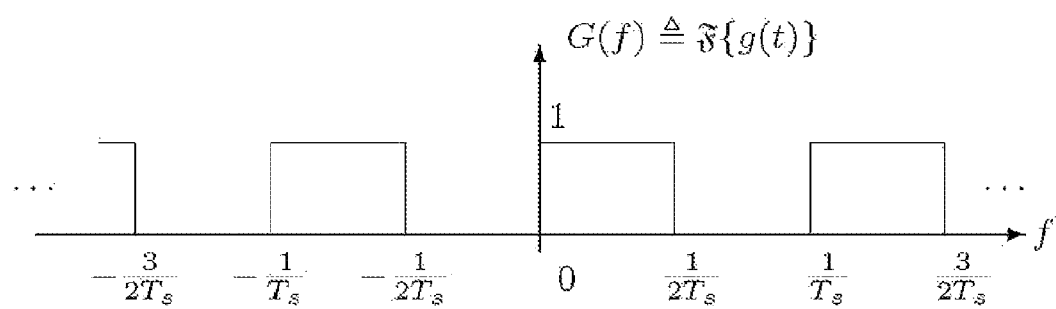
FIG. 3 is a graph illustrating a filter g(t) that shows a frequency characteristic of a square pulse train in a frequency-domain.

FIG. 3 is a graph illustrating a filter g(t) that shows a frequency characteristic of a square pulse train in a frequency-domain.

Referring to FIG. 3, in G(f) that is a Fourier transform function of the filter g(t), 0 and 1 are repeated in a period of $\frac{1}{2}T_s$. Therefore, G(f) is represented as follows by a following equation 1.

$$G(f) \triangleq \begin{cases} 0, & \text{for } -\frac{1}{2T_s} \leq f < 0, \\ 1, & \text{for } 0 \leq f < \frac{1}{2T_s}, \text{ and} \\ G\left(f + \frac{1}{T_s}\right), & \text{elsewhere.} \end{cases} \quad \text{[Equation 1]}$$

The input signal passes through a filter having a value of 0 or 1 in accordance with a frequency value.

Figure 4:
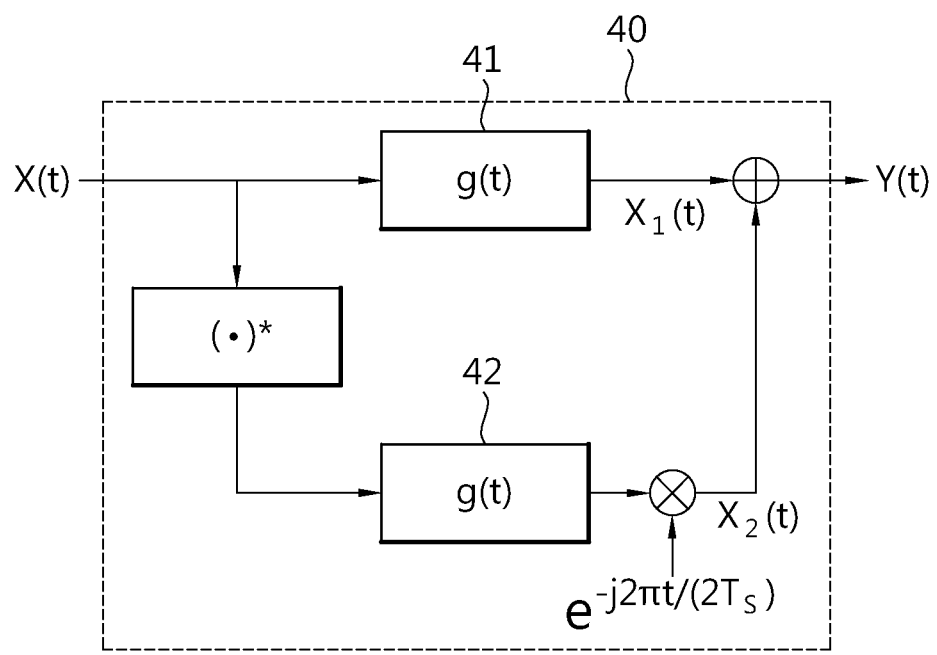
FIG. 4 is an example of a block diagram illustrating a structure of a frequency shift (FRESH) properizer.

FIG. 4 is an example of a block diagram illustrating a structure of a frequency shift (FRESH) properizer.

In the block diagram of FIG. 4, X(t) and Y(t) are an input of the FRESH properizer 40 and an output of the FRESH properizer 40, respectively. In addition, g(t) of the FRESH properizer 40 means a filter that shows a characteristic of the square pulse train in the frequency-domain and (.)* means a conjugate value of an input value as described above with reference to FIG. 3 and equation 1. Hereinafter, for convenience sake, in FIG. 4, the filter positioned in the upper end of the FRESH properizer 40 is referred to as a first filter 41 and the filter positioned in the lower end of the FRESH properizer 40 is referred to as a second filter 42. The positions of the filters illustrated in the drawing are exemplary and the first filter 41 and the second filter 42 may have the same structure.

Meanwhile, the input of the FRESH properizer 40 and the output of the FRESH properizer 40 have the relationship illustrated in a following equation 2.

$$Y(t) \triangleq X(t) * g(t) + \{X(t)^* * g(t)\} e^{-j2\pi \frac{t}{2T_s}}, \quad \text{[Equation 2]}$$

FIG. 5 illustrates an example of the input of the FRESH properizer and the output of the FRESH properizer.

In the example of FIG. 5, s(t) having a characteristic of S(f) in the frequency-domain, that is, having S(f) as a Fourier transform function is input as the FRESH properizer (X(t)=s(t)). At this time, the output Y(t) of the FRESH properizer 40 described above with reference to FIG. 4 may be the sum of the output $X_1(t)$ of the first filter 41 and the output $X_2(t)$ of the second filter 42. $|S_1(f)|$ and $|S_2(f)|$ of FIG. 5 are the amplitude of the output $X_1(t)$ of the first filter 41 and the amplitude of the output $X_2(t)$ of the second filter 42 in the frequency-domain, respectively.

Meanwhile, following equations represent the case in which a signal is not detected (equation 3-1) and the case in which a signal is detected (equation 3-2), in the case of using the FRESH properizer.

$$\mathcal{H}_0 : Z(t) = X(t) \quad \text{[Equation 3-1]}$$

$$\mathcal{H}_1 : Z(t) = X(t) + N(t) \quad \text{[Equation 3-2]}$$

The presence of the signal X(t) may be determined by calculating a likelihood ratio to compare the calculated likelihood ratio with a specific threshold. A log value of the likelihood ratio used here may be calculated by a following equation 4.

$$l(Z(t)) = \frac{1}{N_0} \int_{\mathcal{J}} \int_{\mathcal{J}} Z(t)^* q_X(t,s) Z(s) dt ds \quad \text{[Equation 4]}$$

where, $\mathfrak{I}$ is a detecting time and $$\mathcal{J} \triangleq \{t : -T/2 \leq t < T/2\},$$

T is a common period, $N_0$ is a power density of a noise signal and $(\bullet)^*$ is a complex conjugate function, $q_X(t,s)$ is calculated by solving a following integral equation 5

$$r_X(t,s) = \int_{\mathcal{J}} q_X(t,u) r_X(u,s) du + N_0 q_X(t,s), \forall t,s \in \mathcal{J} \quad \text{[Equation 5]}$$

where, $r_X(t,s)$ is an auto-correlation function of X(t).

The presence of the signal X(t) is determined by comparing l(Z(t)) with a specific threshold. That is, after calculating l(Z(t)) by the equation 4, it is determined that the signal X(t) exists when l(Z(t)) is larger than the specific threshold and that the signal X(t) does not exist when l(Z(t)) is smaller than or equal to the specific threshold.

The presence of the signal X(t) may be determined by performing sampling.

Therefore, the signal X(t) is oversampled L times. That is, sampling is performed every $$t = \frac{nT_s}{L}$$

during an observing time t∈[−KT$_s$·KT$_s$] so that a received vector Z is obtained. As a result, the length of the received vector Z may be 2KL.

Meanwhile, as described above, according to the conventional signal detecting method, the received vector Z is transformed to the frequency-domain by a following equation 6.

$$\begin{bmatrix} W & 0 \\ 0 & W \end{bmatrix} \begin{bmatrix} Z \\ Z^* \end{bmatrix} = \begin{bmatrix} WZ \\ WZ^* \end{bmatrix}$$ [Equation 6]

where, a matrix W is a centered discrete Fourier transform (DFT) matrix and the (m, n)th component of the matrix W is defined by a following equation 7.

$$[W]_{m,n} \triangleq \frac{1}{\sqrt{2KL}} e^{-j2\pi \frac{(m-c)(n-c)}{2KL}}$$ [Equation 7]

where, in the equation 7, a constant c is defined by a following equation 8.

$$c=(2KL+1)/2$$ [Equation 8]

Meanwhile, the same result as that obtained by the equation 7 and the equation 8 may be obtained using common DFT instead of the centered DFT and the transform process may be implemented by a well-known method.

Referring to the EQUATION 6, it is noted that both the received vector Z and the complex conjugate Z* of the received vector Z are considered. Finally, the length of the vector transformed to the frequency-domain by the equation 6 is 4KL.

However, since the same information exists in the received vector Z and the complex conjugate Z* of the received vector Z, when the duplicated part is eliminated to process the received vector Z and the complex conjugate Z* of the received vector Z, calculation complexity may be reduced. Therefore, unlike in the conventional signal detecting method (i.e., the equation 6), the received vector Z and the complex conjugate Z* of the received vector Z are transformed to the frequency-domain by a following equation 9.

$$\begin{bmatrix} 0_{1 \times 2KL} & w_{K+1} \\ \vdots & \vdots \\ 0_{1 \times 2KL} & w_{2K} \\ w_{K+1} & 0_{1 \times 2KL} \\ \vdots & \vdots \\ w_{2K} & 0_{1 \times 2KL} \\ \vdots & \vdots \\ 0_{1 \times 2KL} & w_{2KL-K+1} \\ \vdots & \vdots \\ 0_{1 \times 2KL} & w_{2KL} \\ w_{2KL-K+1} & 0_{1 \times 2KL} \\ \vdots & \vdots \\ w_{2KL} & 0_{1 \times 2KL} \end{bmatrix} \begin{bmatrix} Z \\ Z^* \end{bmatrix}$$ [Equation 9]

where, $w_k$ is the kth row of the centered DFT matrix. The length of the vector transformed to the frequency-domain by the equation 9 is 2KL. In comparison with the conventional signal detecting method (i.e., the equation 6), it is noted that the length of the transformed vector is half the length of the vector transformed to the frequency-domain by the conventional signal detecting method.

A method of halving the length of the vector, that is, a method of eliminating the duplicated part is as follows. In the equation 6, a matrix including the received vector Z and the complex conjugate Z* of the received vector Z is multiplied by the matrix including the two centered DFT matrices. At this time, the size of the obtained centered DFT matrix is 2KL×2KL.

In the 2KL rows of each of the centered DFT matrices, first, K rows are eliminated. Then, K rows are left. Then, K rows are eliminated and K rows are left. When the above processes are repeated, only KL rows are left among the 2KL rows of the DFT matrix W.

To the contrary, first, K rows may be left and K rows may be eliminated.

The transform matrix of the equation 9 is obtained by eliminating half rows of the transform matrix of the equation 6 by the above-described method and by reversing prior 2KL columns and posterior 2KL columns. At this time, the detecting method may be identically processed without reversing the prior 2KL columns and the posterior 2KL columns. In addition, the equation 9 may be implemented by a method of transforming the received vector Z and the complex conjugate Z* of the received vector Z by centered DFT or fast Fourier transform (FFT) to select corresponding rows and to eliminate the remaining rows like in the equation 6.

When the preceding matrix of the equation 9 is defined as Ŵ, a vector Ẑ transformed to the frequency-domain may be defined by a following equation 10.

$$\hat{Z} \triangleq \hat{W} \begin{bmatrix} Z \\ Z^* \end{bmatrix}$$ [Equation 10]

A method of determining the presence of the signal X(t) using Ẑ defined as described above is as follows.

$$l(\hat{Z}) = \hat{Z}^H (\sigma^{-2} I_{2KL} - (\sigma^2 I_{2KL} + \hat{S}_{\hat{Z}})^{-1}) \hat{Z}$$ [Equation 11]

where, $(\cdot)^H$ is a Hermitian operator, $I_{2KL}$ is a 2KL×2KL unit matrix, $\sigma^2$ is a variance of a noise signal and $\hat{S}_{\hat{Z}}$ is a covariance matrix of the transformed signal Ẑ.

At this time, the covariance matrix $\hat{S}_{\hat{Z}}$ may be calculated from a previously received signal of a user by a previously known method; or when an oversampled signal is used, timing and phase may be divided into a number of slots to obtain the covariance matrix $\hat{S}_{\hat{Z}}$ for each of the slots. According to the latter calculating method, signals may be detected for the respective slots.

l(Ẑ) calculated by the equation 11 is compared with a specific threshold to determine that the signal X(t) exists when l(Ẑ) is larger than the threshold and to determine that the signal X(t) does not exist when l(Ẑ) is smaller than or equal to the threshold.

In the conventional signal detecting method, an inverse matrix of $\hat{S}_{\hat{Z}}$ of 4KL×4KL is required in order to calculate by the equation 11. However, in the signal detecting method according to the present invention, an inverse matrix of $\hat{S}_{\hat{Z}}$ of 2KL×2KL is required. Therefore, a signal detecting method having lower calculation complexity than that of the conventional signal detecting method may be performed.

Meanwhile, an equation 12 may be used instead of the equation 11.

$$l(\hat{Z}) = \frac{1}{N_0} \sum_{k=1}^{2KL} \frac{\lambda_k}{\lambda_k + N_0} |\upsilon_k^{\mathcal{H}} \hat{Z}|^2 \qquad \text{[Equation 12]}$$

In the EQUATION 12, $N_0$ is a power density of a noise signal, $\lambda_k$ and $\upsilon_k$ are a kth eigenvalue and a kth eigenvector of $\hat{S}_{\hat{Z}}$ that is the covariance matrix of $\hat{Z}$, respectively. Therefore, in order to obtain the eigenvalue and the eigenvector, the covariance matrix $\hat{S}_{\hat{Z}}$ must be grasped. As described above, the covariance matrix may be calculated from the previously received signal of the user by the previously known method; or when the oversampled signal is used, the timing and the phase may be divided into a number of slots to obtain the covariance matrix $\hat{S}_{\hat{Z}}$ for each of the slots.

$l(\hat{Z})$ calculated by the equation 12 is compared with the specific threshold to determine that the signal X(t) exists when $l(\hat{Z})$ is larger than the threshold and to determine that the signal X(t) does not exist when $l(\hat{Z})$ is smaller than or equal to the threshold.

Figure 6:
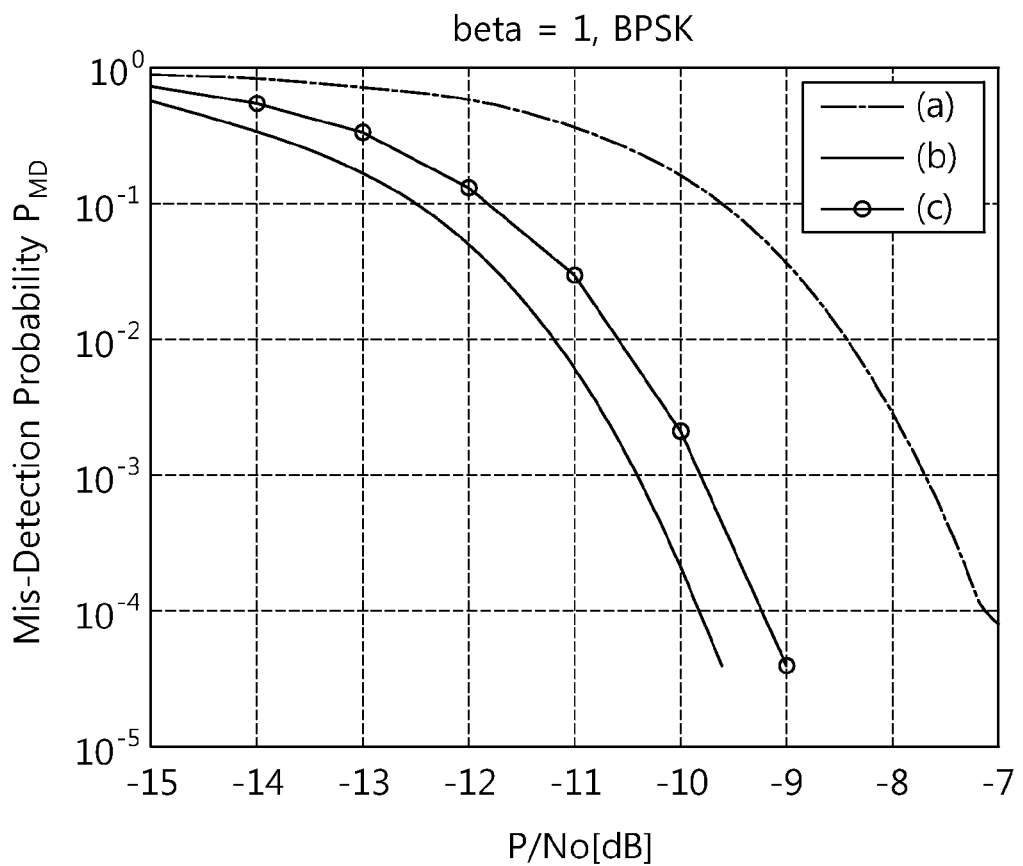
FIG. 6 illustrates simulation results representing performances of signal detecting methods.

FIG. 6 illustrates simulation results representing performances of signal detecting methods. (a) illustrates detection performance of an energy detecting method. (b) and (c) illustrate performances of the signal detecting method according to the present invention; (b) illustrates the case of estimating the eigenvalue of the covariance matrix $\hat{S}_{\hat{Z}}$ and the eigenvector of the covariance matrix $\hat{S}_{\hat{Z}}$ when information on the eigenvalue of the covariance matrix $\hat{S}_{\hat{Z}}$ and the eigenvector of the covariance matrix $\hat{S}_{\hat{Z}}$ is provided. (c) illustrates the case of estimating the eigenvalue of the covariance matrix $\hat{S}_{\hat{Z}}$ and the eigenvector of the covariance matrix $\hat{S}_{\hat{Z}}$ using information collected before performing sensing. The respective simulation results represent probabilities of mis-detecting that a signal does not exist nevertheless the signal exists under the condition that a probability of false-alarming that a BPSK signal whose excess bandwidth is 1 exists nevertheless the BPSK signal does not exist is no more than 1%.

Figure 7:
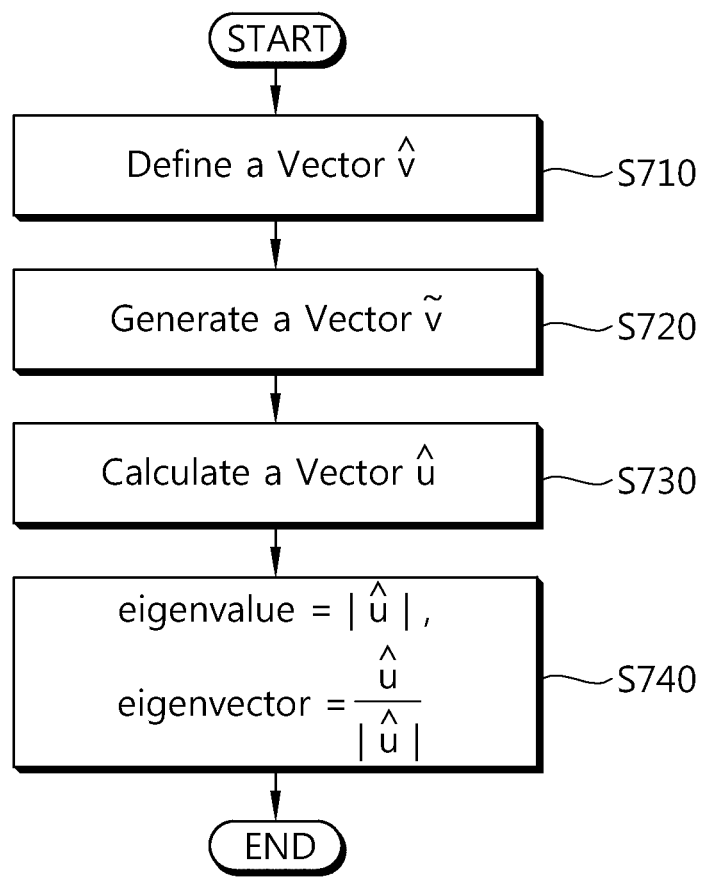
FIG. 7 is a flowchart describing a method of estimating the eigenvalue and the eigenvector used by (c) of FIG. 6.

FIG. 7 is a flowchart describing a method of estimating the eigenvalue and the eigenvector used by (c) of FIG. 6.

A received vector in an ith time slot before performing sensing is referred to S−i and a vector $\hat{\upsilon}$ is defined by a following equation 13 (S710).

$$\hat{\upsilon} \triangleq \frac{1}{D} \sum_{i=1}^{D} \begin{bmatrix} W s_{-i} \\ W s_{-i}^* \end{bmatrix} \qquad \text{[Equation 13]}$$

That is, $\hat{\upsilon}$ means that the vectors received in the ith time slot before performing sensing are averaged in the frequency-domain.

With respect to n=K, . . . , 2K, [n, n+2K, n+4K, . . . , n+2(L−1)K]th and [n+2KL, n+2(L+1)K, n+2(L+2)K, . . . , n+2(2L−1)K]th components of the vector $\hat{\upsilon}$ are selected and the components are piled in the order of [n+2KL, n, n+2(L+1)K, n+2K, n+2(L+2)K, n+4K, . . . , n+2(2L−1)K, n+2(L−1K)] to generate a vector $\hat{\upsilon}$ (S720). At this time, when a calculating method (e.g. DFT is performed using another matrix) different from the above-described examples (e.g. the equations 6 and 9) is used, the order of arranging the components may vary.

The vector $\hat{\upsilon}$ and a vector whose length is K, whose nth component is 1, and whose remaining components are all 0 are Konecker produced to calculate a vector $\hat{u}$ (S730).

The magnitude of the vector $\hat{u}$ is estimated as a nth eigenvalue, a unit vector obtained by dividing the vector $\hat{u}$ by the magnitude of the vector $\hat{u}$, i.e. $|\hat{u}|$ is estimated as an eigenvector (S740).

Meanwhile, in (c) of FIG. 6, D is configured as 3 (D=3).

Figure 8:
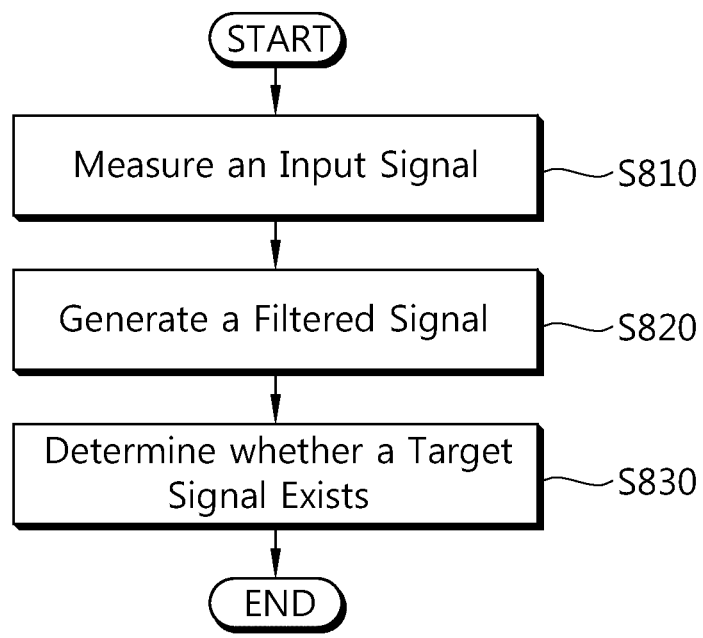
FIG. 8 is a method for detecting a radio signal by a wireless device in a wireless communication system according to an embodiment of the present invention.

FIG. 8 is a method for detecting a radio signal by a wireless device in a wireless communication system according to an embodiment of the present invention.

The wireless device measures an input signal received by a RF unit of the wireless device (S810). If a target signal exists in the input signal, the input signal is a mixed signal of the target signal and a noise signal. Otherwise, the input signal is the noise signal.

The wireless device eliminates a duplicated part between the input signal and a complex conjugate signal of the input signal and generates a filtered signal (S820). The wireless device may perform filtering and frequency-shifting processes in order to eliminate the duplicated part. For example, the wireless device may include the FRESH properizer illustrated in FIG. 4 or a processor included in the wireless device may function as the FRESH properizer. As described above, the FRESH properizer may include two filters. A first filter filters the input signal and a second filter filters the complex conjugate signal of the input signal. The filtered complex conjugate signal may be frequency-shifted to be added to the filtered input signal. Finally, a filtered signal may be generated by the equation 9.

The wireless device determines whether a target signal exists in the input signal based on the filtered signal (S830).

For example, the frequency-domain correlation matrix of the filtered signal is approximated with a block-circulant matrix using the fact that the target signal has the second-order cyclostationary feature and it is possible to determine whether the target signal exists in the input signal based on the block-circulant matrix. At this time, the equation 4 and the equation 5 may be used.

For another example, the filtered signal is transformed to a frequency-domain, the frequency-domain correlation matrix of the transformed signal is approximated with diagonal blocks, and it is possible to determine whether the target signal exists in the input signal based on the diagonal blocks. At this time, the equation 11 or the equation 12 may be used. In addition, the centered DFT may be used.

Figure 9:
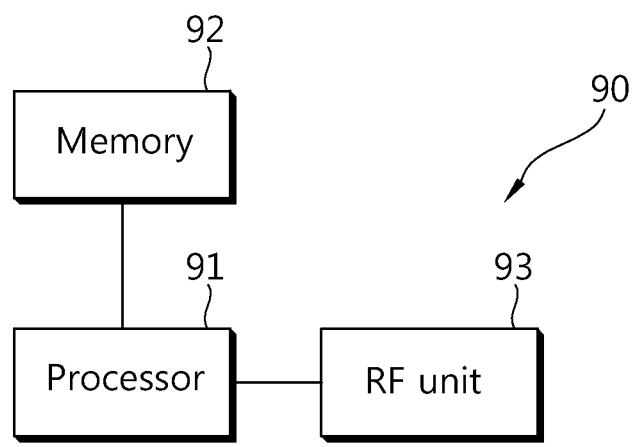
FIG. 9 is a block diagram showing the wireless communication system in which the embodiment of the present invention is implemented.

FIG. 9 is a block diagram showing the wireless communication system in which the embodiment of the present invention is implemented.

The wireless device 90 includes a processor 91, memory 92 and radio frequency (RF) unit 93. The memory 92 is connected to the processor 91, and stores various information for driving the processor 91. The RF unit 93 is connected to the processor 91, and transmits and/or receives radio signal. The processor 91 implements proposed functions, procedures and/or methods. In the embodiment of the present invention, the operation of the wireless device can be implemented by the processor 91.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for detecting a radio signal in a wireless communication system, the method comprising:
    measuring, by a wireless device, an input signal received by a RF unit of the wireless device;
    eliminating, by the wireless device, a duplicated part between the input signal and a complex conjugate signal of the input signal to generate a filtered signal; and
    determining, by the wireless device, whether a target signal exists in the input signal based on the filtered signal.

2. The method of claim 1, wherein the step of eliminating the duplicated part includes the steps of:
    filtering the input signal by a first filter to generate a first signal;
    filtering the complex conjugate signal by a second filter to generate a second signal, the second filter having a same frequency characteristic as the second filter;
    frequency-shifting the second filtered signal to generate a shifted second signal; and
    generating the filtered signal based on the first signal and the shifted second signal.

3. The method of claim 1, wherein the target signal has a second-order cyclostationary feature.

4. The method of claim 3, wherein the step of determining whether a target signal exists in the input signal includes the step of approximating a frequency-domain correlation matrix of the filtered signal with a block-circulant matrix.

5. The method of claim 4, wherein the step of determining whether a target signal exists in the input signal includes the steps of:
    (a) calculating a likelihood ratio l(Z(t)) of the filtered signal Z(t) by a following equation, $$l(Z(t)) = \frac{1}{N_0} \int_{\mathcal{T}} \int_{\mathcal{T}} Z(t)^* q_X(t,s) Z(s) dt ds$$

where, $\mathcal{T}$ is a detecting time and $$\mathcal{T} \triangleq \{t : -T/2 \leq t < T/2\},$$

T is a common period in the second-order cyclostationary feature of the target signal, $N_0$ is a power density of a noise signal and $(\bullet)^*$ is a complex conjugate function, $q_X(t,s)$ is calculated by solving a following integral equation, $$r_X(t,s) = \int_{\mathcal{T}} q_X(t,u) r_X(u,s) du + N_0 q_X(t,s), \forall t, s \in \mathcal{T}$$

where, $r_X(t,s)$ is an auto-correlation function of the input signal X(t);
    (b) comparing the likelihood ratio l(Z(t)) with a threshold; and
    (c) determining that there is the target signal if the likelihood ratio l(Z(t)) is larger than the threshold.

6. The method of claim 3, wherein the step of determining whether a target signal exists in the input signal includes the steps of:
    transforming the filtered signal to a frequency-domain to generate a transformed signal; and
    approximating a correlation matrix of the transformed signal with diagonal blocks.

7. The method of claim 6, wherein the filtered signal is transformed by the centered discrete Fourier transform (DFT).

8. The method of claim 6, wherein the step of determining whether a target signal exists in the input signal includes the steps of:
    (a) calculating a likelihood ratio $l(\hat{Z})$ of the transformed signal $\hat{Z}$ by a following equation, $$l(\hat{Z}) = \hat{Z}^{\mathcal{H}} (\sigma^{-2} I_{2KL} - (\sigma^2 I_{2KL} + \hat{S}_{\hat{Z}})^{-1}) \hat{Z}$$

where, a length of the transformed signal $\hat{Z}$ is 2KL, $(\bullet)^H$ is a Hermitian operator, $I_{2KL}$ is a 2KL×2KL unit matrix, $\sigma^2$ is a variance of a noise signal and $\hat{S}_{\hat{Z}}$ is a covariance matrix of the transformed signal $\hat{Z}$;
    (b) comparing the likelihood ratio $l(\hat{Z})$ with a threshold; and
    (c) determining that there is the target signal if the likelihood ratio $l(\hat{Z})$ is larger than the threshold.

9. The method of claim 6, wherein the step of determining whether a target signal exists in the input signal includes the steps of:
    (a) calculating a likelihood ratio $l(\hat{Z})$ of the transformed signal $\hat{Z}$ by a following equation, $$l(\hat{Z}) = \frac{1}{N_0} \sum_{k=1}^{2KL} \frac{\lambda_k}{\lambda_k + N_0} |v_k^{\mathcal{H}} \hat{Z}|^2$$

where, a length of the transformed signal $\hat{Z}$ is 2KL, $N_0$ is a power density of a noise signal, $\lambda_k$ is a kth eigenvalue of a covariance matrix of the transformed signal $\hat{Z}$, and $v_k$ is a kth eigenvector of the covariance matrix;
    (b) comparing the likelihood ratio $l(\hat{Z})$ with a threshold; and
    (c) determining that there is the target signal if the likelihood ratio $l(\hat{Z})$ is larger than the threshold.

10. A wireless device in a wireless communication system, the wireless device comprising:
    a radio frequency (RF) unit for receiving a radio signal; and
    a processor, operatively coupled with the radio frequency unit, configured to:
    measure an input signal received by the RF unit;
    eliminate a duplicated part between the input signal and a complex conjugate signal of the input signal to generate a filtered signal; and
    determine whether a target signal exists in the input signal in the input signal based on the filtered signal.

11. The wireless device of claim 10, wherein the processor is configured to eliminate the duplicated part by:
    filtering the input signal by a first filter to generate a first signal;

filtering the complex conjugate signal by a second filter to generate a second signal, the second filter having a same frequency characteristic as the second filter;

frequency-shifting the second filtered signal to generate a shifted second signal; and generating the filtered signal based on the first signal and the shifted second signal.

12. The wireless device of claim 10, wherein the target signal has a second-order cyclostationary feature.

13. The wireless device of claim 12, wherein the processor is configured to determine whether a target signal exists in the input signal by approximating a frequency-domain correlation matrix of the filtered signal with a block-circulant matrix.

14. The wireless device of claim 12, wherein the processor is configured to determine whether a target signal exists in the input signal by:

transforming the filtered signal to a frequency-domain to generate a transformed signal; and approximating a correlation matrix of the transformed signal with diagonal blocks.

15. The wireless device of claim 14, wherein the filtered signal is transformed by the centered discrete Fourier transform (DFT).

\* \* \* \* \*